US012124598B2

(12) United States Patent
Yadav et al.

(10) Patent No.: US 12,124,598 B2
(45) Date of Patent: Oct. 22, 2024

(54) COPY DISCOVERY OF CLUSTERED ASSETS IN NODE AGNOSTIC WAY

(71) Applicant: Dell Products L.P., Round Rock, TX (US)

(72) Inventors: Sunil Yadav, Bangalore (IN); Shelesh Chopra, Bangalore (IN); Preeti Varma, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 163 days.

(21) Appl. No.: 17/872,660

(22) Filed: Jul. 25, 2022

(65) Prior Publication Data

US 2024/0028464 A1  Jan. 25, 2024

(51) Int. Cl.
*G06F 3/06* (2006.01)
*G06F 21/62* (2013.01)

(52) U.S. Cl.
CPC .......... *G06F 21/6218* (2013.01); *G06F 3/061* (2013.01); *G06F 3/065* (2013.01); *G06F 3/067* (2013.01)

(58) Field of Classification Search
CPC .......... G06F 3/061; G06F 3/065; G06F 3/067; G06F 21/6218; G06F 11/1451; G06F 11/1464
See application file for complete search history.

(56) References Cited

U.S. PATENT DOCUMENTS

| | | | |
|---|---|---|---|
| 7,549,037 B1 | 6/2009 | Kale | |
| 8,069,366 B1 | 11/2011 | Wenzel | |
| 8,225,057 B1 | 7/2012 | Zheng | |
| 8,473,463 B1 | 6/2013 | Wilk | |
| 8,595,454 B1 | 11/2013 | Nagarkar | |
| 8,990,162 B1 * | 3/2015 | Kushwah | G06F 11/1469 707/646 |
| 9,021,296 B1 | 4/2015 | Kiselev | |
| 9,077,580 B1 | 7/2015 | Randhawa et al. | |
| 9,268,784 B1 | 2/2016 | Guo et al. | |

(Continued)

OTHER PUBLICATIONS

PowerProtect Data Manager 19.9, Administration and User Guide, Dell EMC, Jan. 2022 rev. 02, (272 pages).

(Continued)

*Primary Examiner* — Khoa D Doan
*Assistant Examiner* — Julian S Mendel
(74) *Attorney, Agent, or Firm* — Chamberlain, Hrdlicka, White, Williams & Aughtry; Aly Z. Dossa

(57) ABSTRACT

One or more embodiments of the invention may improve the operation of one or more computing devices in a cluster environment. More specifically, by mapping backups of shared volumes to a cluster client instead of individual data nodes, one or more embodiments of the invention avoid duplicative backups and/or restorations of the same shared assets by the each of the data nodes. Further, if a failure occurs to the particular node the backup may have originated from, in accordance with one or more embodiments of the invention, because the method is agnostic with regards to the individual nodes the backup may have originated from, any remaining data node can discover the backup and perform a restoration or incremental backup. This will provide better protection for the clustered nodes while requiring minimal user/administrator input.

20 Claims, 6 Drawing Sheets

(56) References Cited

U.S. PATENT DOCUMENTS

| | | | |
|---|---|---|---|
| 9,398,092 B1 | 7/2016 | Singhal et al. | |
| 9,501,544 B1 | 11/2016 | Singhal et al. | |
| 9,535,907 B1 | 1/2017 | Stringham | |
| 9,934,107 B1 | 4/2018 | Chikkanayakanahally et al. | |
| 10,108,502 B1 | 10/2018 | Gopinath et al. | |
| 10,191,815 B2 * | 1/2019 | Viswanathan | G06F 3/0619 |
| 10,289,441 B1 | 5/2019 | Chopra et al. | |
| 10,740,005 B1 | 8/2020 | Ives et al. | |
| 10,853,189 B2 * | 12/2020 | Bishop | G06F 11/1451 |
| 10,860,427 B1 | 12/2020 | Chakraborty | |
| 10,936,545 B1 | 3/2021 | Chockalingam et al. | |
| 11,048,591 B1 | 6/2021 | Mamidi | |
| 2003/0163495 A1 | 8/2003 | Lanzatella | |
| 2003/0221074 A1 | 11/2003 | Satoyama | |
| 2008/0059721 A1 | 3/2008 | Turner et al. | |
| 2009/0177856 A1 | 7/2009 | Herne | |
| 2012/0117028 A1 | 5/2012 | Gold et al. | |
| 2014/0229695 A1 | 8/2014 | Dinkar | |
| 2014/0330785 A1 * | 11/2014 | Isherwood | G06F 16/2458 707/640 |
| 2016/0034366 A1 | 2/2016 | Anglin | |
| 2016/0048430 A1 | 2/2016 | Bolik | |
| 2016/0203054 A1 | 7/2016 | Zhang | |
| 2018/0300206 A1 | 10/2018 | Dai et al. | |
| 2018/0352032 A1 * | 12/2018 | Liu | G06F 11/0757 |
| 2019/0377643 A1 | 12/2019 | Zhang | |
| 2020/0293193 A1 | 9/2020 | Littlefield et al. | |
| 2020/0351345 A1 | 11/2020 | Bansod | |
| 2021/0034709 A1 | 2/2021 | Patwardhan | |
| 2021/0055996 A1 | 2/2021 | Owens et al. | |
| 2021/0081287 A1 | 3/2021 | Koning et al. | |
| 2021/0182156 A1 * | 6/2021 | Sharma | G06F 11/1448 |
| 2021/0216412 A1 * | 7/2021 | Navon | G06F 3/0653 |

OTHER PUBLICATIONS

Dell PowerStore: Clustering and High Availability, White Paper, Dell Technologies, Jul. 2022 (45 pages).

* cited by examiner

COPY DISCOVERY OF CLUSTERED ASSETS IN NODE AGNOSTIC WAY

BACKGROUND

In an enterprise environment, clustering is frequently used. One version of clustering, failover clustering, allows for a plurality of nodes to work together to increase the availability and scalability of the nodes. If a failure occurs in one or more of the nodes, other nodes then are able to provide the services of the failed nodes with minimum disruptions to the end users of the node(s). To prevent loss of important data, performing backups and restorations of the assets located on the plurality of nodes or other related computing devices is necessary. However, in a clustering system that includes shared storage, performing a backup and/or restoration becomes increasingly difficult.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
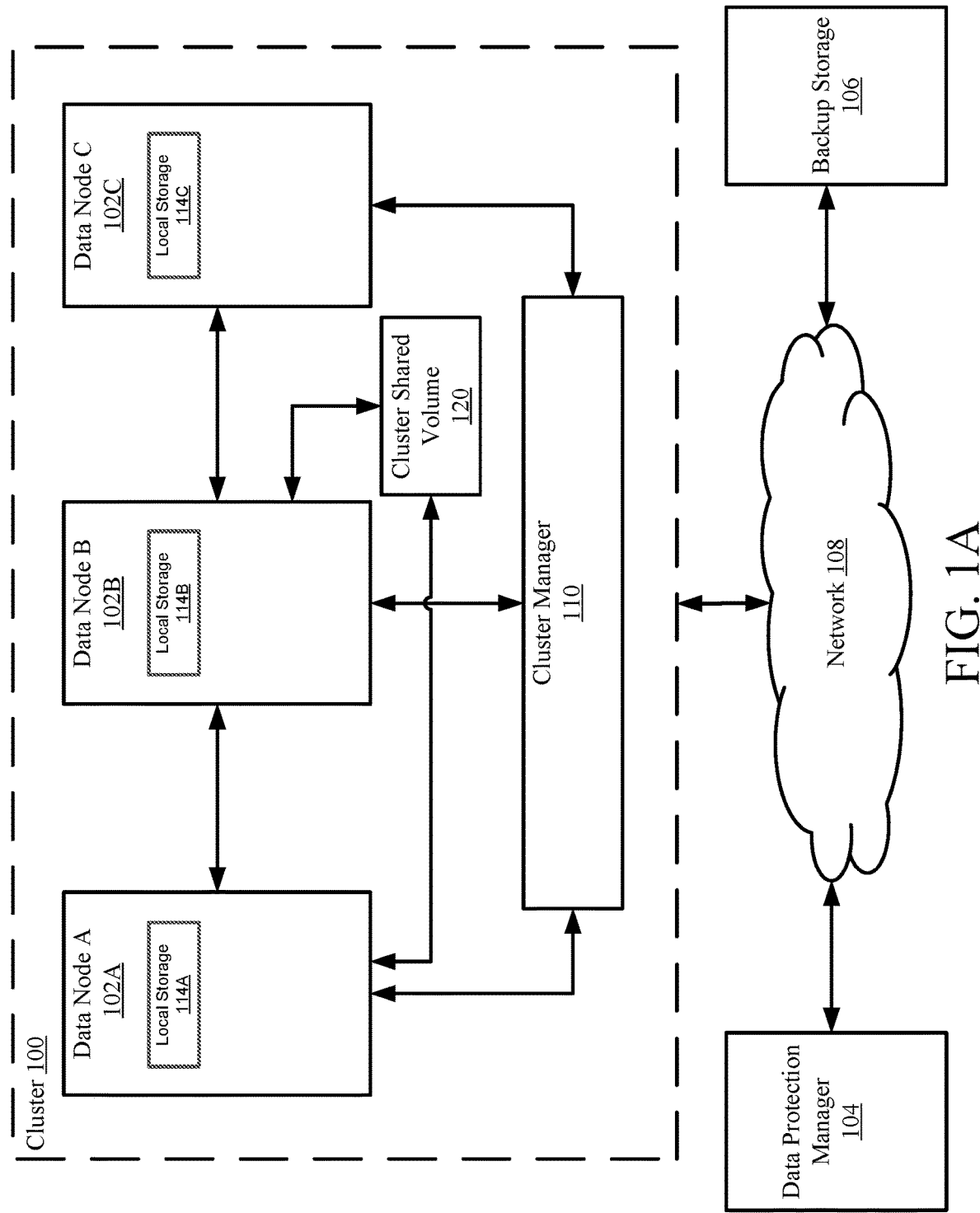
FIG. 1A shows a diagram of a cluster environment in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regards to a figure, in various embodiments of the invention, may be equivalent to one or more like-named components described with regards to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to C. As used herein, the aforementioned labeling means that the element may include any number of items and does not require that the element include the same number of elements as any other item labeled as A to C. For example, a data structure may include a first element labeled as A and a second element labeled as C. This labeling convention means that the data structure may include any number of the elements. A second data structure, also labeled as A to C, may also include any number of elements. The number of elements of the first data structure and the number of elements of the second data structure may be the same or different.

In general, embodiments of the invention relate to systems and methods for managing data clusters. More specifically, embodiments of the invention relate to a method of performing backups on shared volumes such as cluster shared volumes (CSV).

In an enterprise environment using clustering, the environment includes one or more clusters which each include a plurality of data nodes (also referred to as nodes). The data nodes each comprise of one or more computing devices. The data nodes are each associated with local storage devices, as well as shared storage devices including active-passive shared storage devices (where only one or a few if the active nodes have active access to the shared storage device) and active-active shared storage devices (where all the nodes have active access to the shared storage device) including CSVs. A CSV is a shared disk that is made accessible for reading and writing operations by all the nodes within the failover cluster. The CSV can include multiple virtual discs. It provides a consistent distributed namespace that clustered roles can use to access shared storage from all nodes.

In traditional clustering systems, there is no efficient intelligence that can protect a clustering system that includes at least one CSV seamlessly. Such protection includes performing a backup and related restoration of the backup when a failure occurs. In traditional clustering system, from each data node's perspective, a CSV is owned by the data node, and is treated like any of the other local volumes on the data node. However, this treatment can result in multiple data nodes performing, what is essentially the same backup on the CSV repeatedly, needlessly using up system resources. Further during a restoring there is no clear intelligence for determining which data node should perform the restoration on the data and applications associated with the CSV. Both scenarios can result in discontinuous and/or fragmented backups and/or restorations. A user or administrator may be required to perform manual interventions and/or establish dynamic rules to continue providing the data protection and/or perform a restoration if the node or CSV is owned or administrated by fails.

In order to address these and other issues associated with using a CSV with failover clustering, one or more embodiments of the invention include methods performing backup copy discovery in such a way as the method is agnostic with regards to the individual data nodes that the backup may have originated from. The backup copy is associated with the cluster client (i.e., a logical data structure), instead of each data node. This allows the backup copy to be discovered even when a particular data node that was obtained from goes down. This will provide better protection for the clustered nodes, while requiring minimal user/administrator input.

FIG. 1A shows a diagram of a system in accordance with one or more embodiments of the invention. The system may include a data protection manager (104), backup storage (106) and at least one data cluster (100). The system may include any number of data clusters (100) without departing from the invention. For example, the system may include two data clusters (not shown) that communicate through a network (108). The system may include additional, fewer, and/or other components without departing from the invention. Each of the components in the system may be operatively connected via any combination of wireless and/or wired networks (108).

In one or more embodiments of the invention, the data cluster (100) may include a plurality of data nodes (e.g., 102A-102C), a cluster manager (110), and at least one cluster shared volume(s) (e.g., 120). The system may include any number of data nodes (e.g., 102A-102C) without departing from the invention. For example, the system may include two data nodes (e.g., 102A) and (e.g., 102B) that communicate through an internal network or by other means. The system may include additional, fewer, and/or other components without departing from the invention. Each of the components of the data cluster may be operatively connected via any combination of wireless and/or wired networks (e.g., 108).

In one or more embodiments of the invention, the data protection manager (104) includes the functionality to provide data protection services to the data cluster (100). The data protection manager (104) may include the functionality to provide and/or obtain other and/or additional services without departing from the invention. While FIG. 1A shows the data protection manager (104) as a separate component, it can be a part of the cluster manager (e.g., 110) or located in one or more of the data nodes (e.g., 102A-102C).

To perform the aforementioned data protection services, the data protection manager (104) may include various modules such as a mapping module (not shown). The data protection manager (104) may also include persistent storage (not shown), or it may store data on one or more of the local storage devices (114A-114C) that are associated with the data nodes (e.g., 102A-102C). Alternatively, the data protection manager (104) can store data on the cluster shared volumes (e.g., 120). The data protection manager (104) may include other and/or additional components without departing from the invention. Each of the aforementioned components of the data protection manager is discussed below.

In one or more embodiments of the invention, the data protection manager (104) initiates data protection events such as discovery, backup, and restoration. The data protection manager (104) communicates with the cluster (100) so that the cluster manager (110) or appropriate node (e.g., 102A-102C) can carry out the data protection event.

In one or more embodiments of the invention, the data protection manager (104) may include a user interface that allows a user or administrator to configure or change a data protection event. This may include having a display of a graphical user interface (GUI) that presents options to a user or administrator that they can select from, such as a preferred node to perform the data protection event, or indications of which assets/applications a user or administrator wants to have protected.

Figure 3:
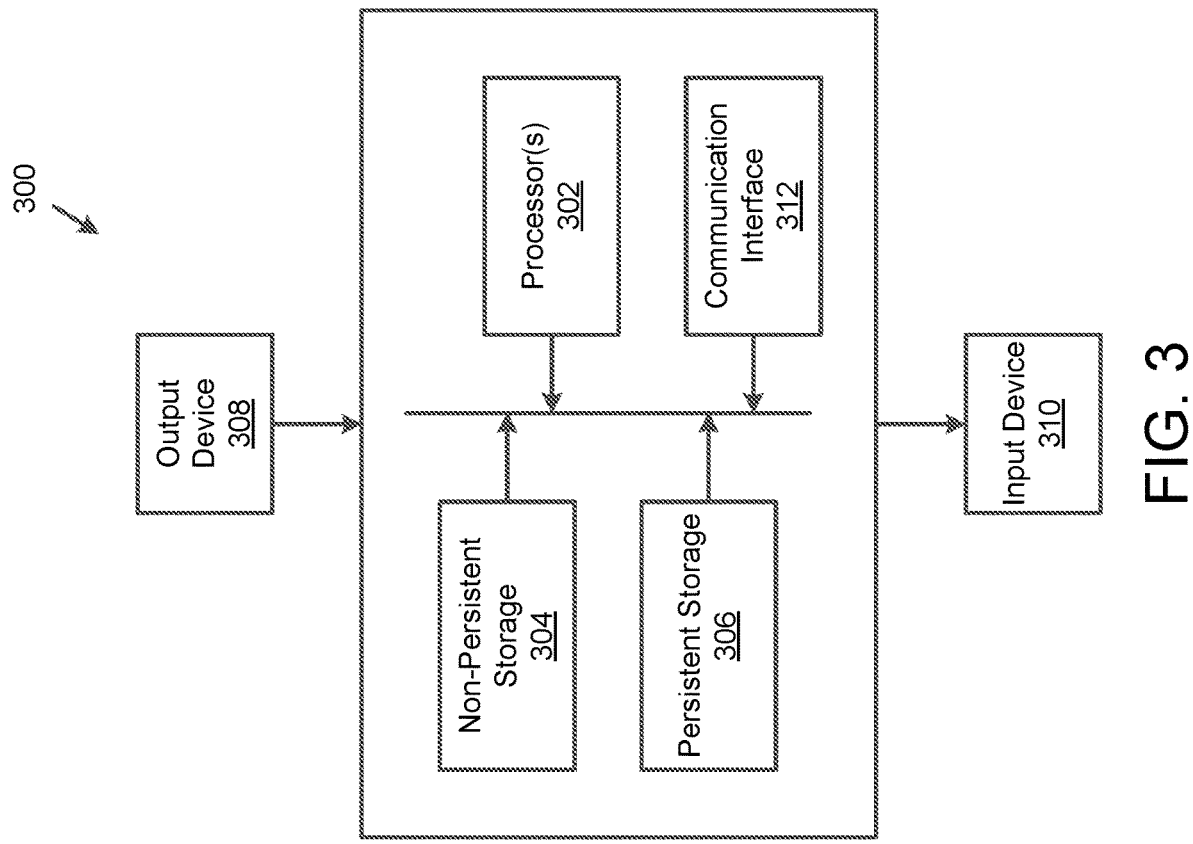
FIG. 3 shows a diagram of a computing device in accordance with one or more embodiments of the invention.

In one or more embodiments of the invention, the data protection manager (104) is implemented as a computing device (see e.g., FIG. 3). The computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions that are stored on the persistent storage, so that when executed by the processor(s) of the computing device it causes the computing device to perform the functionality of the data protection manager (104) described throughout this application.

In one or more embodiments of the invention, the data protection manager (104) is implemented as a logical device. The logical device may utilize the computing resources of any number of computing devices and thereby provide the functionality of the data protection manager (104) as described throughout this application.

In one or more embodiments of the invention, the data protection manager (104) works with backup storage (106) to store backups and mapping information. Backup storage (106) can comprise of local storage/volumes that are stored in any of the local storage devices (e.g., 114A-114C) or the cluster shared volumes (120). In one or more embodiments of the invention, the backup storage (106) can comprise of storage that is not part of the cluster (100). Backup storage (106) can also comprise of off-site storage including but not limited to, cloud base storage and long-term storage such as tape drives, depending on the particular needs of the user and the system. The backup storage (106) may include one or more processors, memory (e.g., random access memory), and persistent storage (e.g., disk drives, solid state drives, etc.).

In one or more embodiments of the invention, the backup storage (106) includes the functionality to provide backup storage services to the data nodes (e.g., 102A-102C) as discussed above. The backup storage services may include (i) obtaining backups of data generated through the performance of computer implemented services from the data nodes (e.g., 102A-102C), (ii) storing data and metadata associated with the backups in persistent storage of the backup storage (106), and (iii) providing backups to the data nodes (e.g., 102A-102C) for restoration purposes and/or other additional purposes without departing from the invention. The backup storage services may include the functionality to provide and/or obtain other and/or additional services without departing from the invention. The backup storage (106) may include any number of backup storages without departing from the invention.

In one or more embodiments of the invention, the backup storage (106) is implemented as a computing device (see e.g., FIG. 3). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device, causes the computing device to perform the functionality of a backup storage (106) as described throughout this application.

In one or more embodiments of the invention, the backup storage (106) is implemented as a logical device. The logical device may utilize the computing resources of any number of computing devices and thereby provide the functionality of the backup storage (106) as described throughout this application.

In one or more embodiments of the invention the data protection manager (104) and backup storage (106), communicate with the cluster (100) through a network (108).

The network (108) can take any form of network including any combination of wireless and/or wired networks. The network (108) can be a local network (LAN) or a wide area network (WLAN) including the Internet or a private enterprise network that connects more than one location. The network (108) can be any combination of the above networks, other known network, or any other combination of network types.

In one or more embodiments of the invention, the network (108) allows the cluster (100) to communicate with other clusters (not shown) and external computing devices such as (but not limited to) a data protection manager (e.g., 104) and backup storage (e.g., 106). The various components of the cluster (100) may also communicate with each other through a network. The network may be a high-speed internal network and/or include part of an external network (e.g., 108). The data nodes (102A-102C), cluster share volume (120) and cluster manager (110) communicate with each other over the internal network and in one or more embodiments of the invention provide fallback functionality.

A network (e.g., network (108)) may refer to an entire network or any portion thereof (e.g., a logical portion of the devices within a topology of devices). A network may include a data center network, a wide area network, a local area network, a wireless network, a cellular phone network, and/or any other suitable network that facilitates the exchange of information from one part of the network to another. A network may be located at a single physical location or be distributed at any number of physical sites. In one or more embodiments, a network may be coupled with or overlap, at least in part, with the Internet.

In one or more embodiments, although shown separately in FIG. 1, the network (108) may include any number of devices within any components (e.g., 100, 104, and 106) of the system, as well as devices external to or between such components of the system. In one or more embodiments, at least a portion of such devices are network devices (not shown). In one or more embodiments, a network device is a device that includes and/or is operatively connected to persistent storage (not shown), memory (e.g., random access memory (RAM)) (not shown), one or more processor(s) (e.g., integrated circuits) (not shown), and at least two physical network interfaces which may provide connections (i.e., links) to other devices (e.g., computing devices, other network devices, etc.). In one or more embodiments, a network device also includes any number of additional components (not shown) such as, for example, network chips, field programmable gate arrays (FPGAs), application specific integrated circuits (ASICs), indicator lights (not shown), fans (not shown), etc. A network device may include any other components without departing from the invention. Examples of a network device include, but are not limited to, a network switch, router, multilayer switch, fibre channel device, an InfiniBand® device, etc. A network device is not limited to the aforementioned specific examples.

In one or more embodiments, network devices are configured to participate in one or more network protocols, which may include discovery schemes, by which a given network device may obtain information about all or any of the network topology in which the network device exists. Such discovery schemes may include sharing of information between network devices and may also include providing information to other devices within the system, such as, for example, data nodes (e.g., 102A-102C), backup storage (e.g., 106) and/or shared storages (e.g., 110).

In one or more embodiments of the invention, a data cluster (e.g., 100) may be implemented as one or more computing devices. A data cluster (e.g., (100)) may include any number of computing devices without departing from the invention. The data cluster (e.g., 100) may include different numbers of computing devices, different quantity, and types of computer resources, and may perform different computer implemented services without departing from the invention.

In one or more embodiments of the invention, the data cluster (100) includes a plurality of data nodes (e.g., 102A-102C) which include the functionality to obtain data protection services from the data protection manager (e.g., 104) and/or the cluster manager (e.g., 110). While shown as including only three data nodes (e.g., 102A-102C), the data cluster (100) can include more or less data nodes without departing from the invention, for example a cluster (100) could comprise of at least sixteen data nodes, fifty data nodes, or a hundred data nodes without departing from the invention. The cluster can also include shared storage including at least one CSV (e.g., 120) which is active with each of the data nodes (e.g., 102A-102C) of the data cluster (100). Other types of shared storage can also or alternatively be included such as active-passive storage and local storage (e.g., 114A-114C).

In one or more embodiments of the invention, the data nodes (e.g., 102A-102B) perform workloads and provide services to clients and/or other entities not shown in the system illustrated in FIG. 1A. The data nodes (e.g., 102A-102C) may further include the functionality to perform computer implemented services for users (e.g., clients, not shown) of the data cluster (100). The computer implemented services may include, for example, database services, electronic mail services, data processing services, etc. The computer implemented services may include other and/or additional types of services without departing from the invention.

During the performance of the aforementioned services, data may be generated and/or otherwise obtained. The data nodes (e.g., 102A-102C) include local storage (e.g., 114A-114C) which may include multiple volumes, as well as shared storage which may include cluster shared volumes (CSVs e.g., 120). The various data storage volumes (e.g., 114A-114C as well as CSV 120) performing data storage services may include performing the data storage services of: storing, modifying, obtaining, and/or deleting data stored on the shared storages (e.g., 120). The data storage services may include other and/or additional services without departing from the invention. The data generated and stored on the shared storages (e.g., 114A-114C as well as CSV (120)) by the data nodes (e.g., 102A-102C) may be valuable to users of the system and therefore may be protected. The data nodes (e.g., 102A-102C) may obtain backup storage services from the backup storage (106). Alternatively, in accordance with one or more embodiments of the invention, the data nodes (e.g., 102A-102C) may provide backup storage services themselves and include backup storage on the local storage (e.g., 114A-114C) or the cluster shared volumes (e.g., 120). The backup storage services may include storing backups of data stored on the shared storages for restoration purposes. The backup storage services may include other and/or additional services without departing from the invention.

The data nodes (e.g., 102A-102C) may include the functionality to perform data protection services for data stored in the various data storage volumes (e.g., 114A-114C as well as CSV 120). The data protection services, in accordance with one or more embodiments of the invention, may include generating backups of data stored in the shared storages (110) and storing the backups in the backup storage (106). The data nodes (e.g., 102A-102C) may include the functionality to perform other and/or additional services without departing from the invention.

The data nodes (e.g., 102A-102C) may include a primary data node (e.g., 102A) and secondary data nodes (e.g., 102B and 102C). The specific configuration of which data node is the primary data node and which data node is the secondary data node can be preconfigured or can be automatically managed by the cluster manager (e.g., 110). The data nodes (e.g., 102A-102C) may include any number of secondary data nodes without departing from the invention. Alternatively, all data nodes (e.g., 102A-102C) may be secondary data nodes with the cluster manager (e.g., 110) performing the additional tasks of the primary node.

The data nodes (e.g., 102A-102C), may be operably connected to one or more cluster shared storages (e.g., 120) and may obtain data storage services from the one or more cluster shared storages (e.g., 120). The data nodes (e.g., 102A-102C) may be operably connected to each other and each data node (e.g., 102A) and may include the ability to use all or part of the volumes including shared active-passive drives that form the local storage (e.g., 114A-114C) of the other data nodes (e.g., 102B and 102C).

In one or more embodiments of the invention, the data nodes (e.g., 102A-102C) are implemented as computing devices (see e.g., FIG. 3). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions which are stored on the persistent storage so that when executed by the processor(s) of the computing device it causes the computing device to perform the functionality of the data nodes (e.g., 102A-102C) as described throughout this application.

In one or more embodiments of the invention, the data nodes (e.g., 102A-102C) are implemented as a logical device. The logical device may utilize the computing resources of any number of computing devices and thereby provide the functionality of the data nodes (e.g., 102A-102C) described throughout this application.

In one or more embodiments of the invention, the data nodes (e.g., 102A-102C) include local storage (e.g., 114A-114C) that is associated with only their assigned data node. The storage also includes shared storage such as a cluster shared volume CSV (e.g., 120) as well as other types of shared volumes including active-passive shared volumes which only provide data storage services to the data nodes they are active on.

The data nodes (e.g., 102A-102C), as well as other components of the cluster and connected devices may perform data storage services. The data storage services may include storing, modifying, obtaining, and/or deleting data stored on the local and shared storages (e.g., 114A-114C and 120) based on instructions and/or data obtained from the data nodes (e.g., 102A-102C) or other components of the cluster (e.g., 100). The data storage services may include other and/or additional services without departing from the invention. The local and shared storages (e.g., 114A-114C and 120) may include any number of storage volumes without departing from the invention.

The local and shared storages (e.g., 114A-114C and 120) may include storage devices (not shown) for storing data. The storage devices may be physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the local and shared storages (e.g., 114A-114C and 120) may utilize portions of any combination of hard disk drives, solid state disk drives, tape drives, and/or any other physical storage medium of any number of computing devices.

In one or more embodiments of the invention, the local and shared storages (e.g., 114A-114C and 120) are implemented as computing devices (see e.g., FIG. 3). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions, which are stored on the persistent storage, so that when executed by the processor(s) of the computing device it causes the computing device to perform the functionality of the local and shared storages (e.g., 114A-114C and 120) as described throughout this application.

In one or more embodiments of the invention, the data nodes (e.g., 102A-102C) as well as the associated local and shared storages (e.g., 114A-114C and 120) are managed by a cluster manager (e.g., 110). The cluster manager (110) performs a plurality of functions not limited to managing and configuring the services provided by the data nodes (e.g., 102A-102C), managing the mapping, and movement of data on the at least the shared volumes including any cluster shared volumes (e.g., 120). The cluster manager (110) can perform other functions attributed to other components of the system or function not described herein without departing from the invention.

In one or more embodiments of the invention the cluster manager (110) includes the functionality to perform a portion of the data protection services of the data protection manager (104). This may include performing discovery of the volumes and assets associated with the data nodes (e.g., 102A-102C) including those stored on the local storage (e.g., 114A-114C) and the CSV (e.g., 120). The cluster manager (110) may also perform, or initiate backups and restorations as discussed in more detail below with regards to the method shown in FIGS. 2A-2C. The cluster manager (110) may include the functionality to perform and or obtain other and/or additional services without departing from the invention.

In one or more embodiments of the invention, the cluster manager (110) may perform discovery on the volumes and assets associated with the data nodes (e.g., 102A-102C) including those stored on the local storage (e.g., 114A-114C) and the CSV (e.g., 120). During discovery, the cluster manager queries each data node (e.g., 102A-102C) and their associated local and shared storage (e.g., 114A-114C and 120). Using the results of the query, the cluster manager (110) produces an asset mapping, a non-limiting example is shown in FIG. 1B of the asset mapping (e.g., 128) that also include backup mapping in accordance with one or more embodiments of the invention.

In accordance with one or more embodiments of the invention, when a backup is initiated by a data node (e.g., 102A-102C) or other component of the cluster (e.g., 100), such as the data protection manager (e.g., 104) or backup storage (e.g., 106), the cluster manager (110) maps the resulting backup to an appropriate backup mapping in the asset mapping. Although shown in FIG. 1B, where both the asset mapping and backup mapping are included in the same mappings, in an alternative one or more embodiments of the invention the backup mapping is separate from the asset mapping.

Figure 2A:
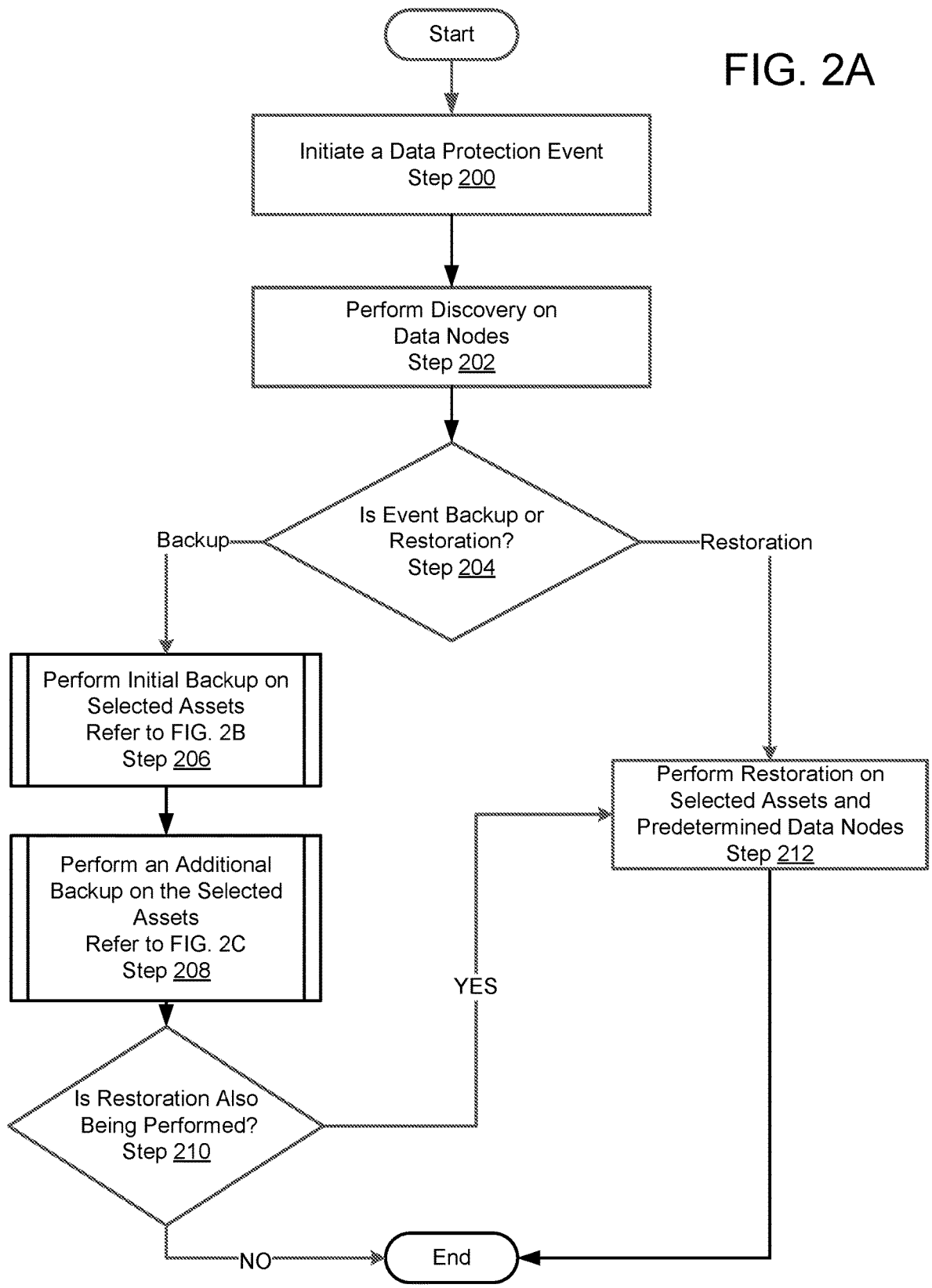
FIG. 2A shows a flowchart of a method for performing a data protection event such as a backup and/or restoration in accordance with one or more embodiments of the invention.
Figure 2B:
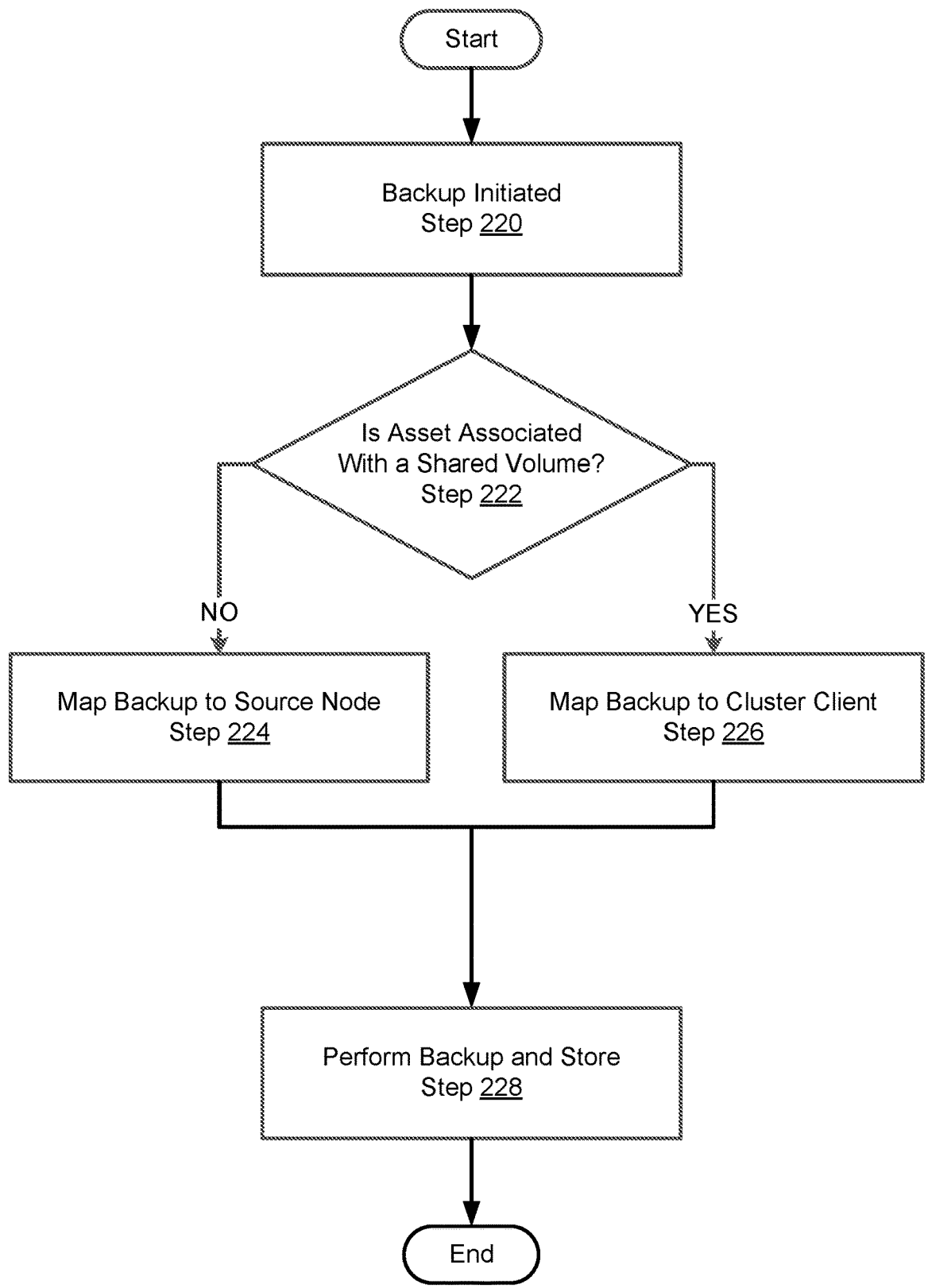
FIG. 2B shows a flowchart of a method for performing an initial backup on selected data node in accordance with one or more embodiments of the invention.
Figure 2C:
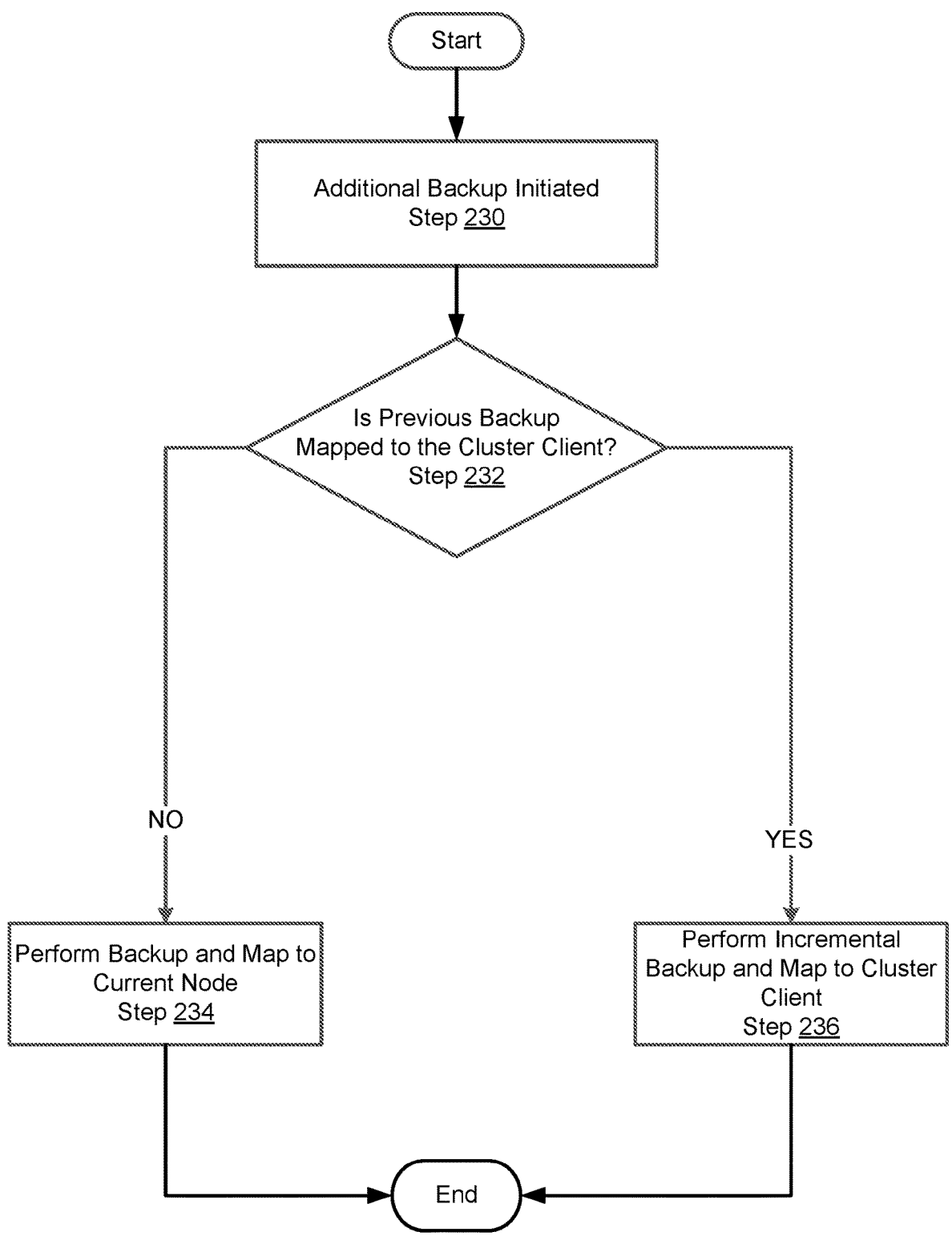
FIG. 2C shows a flowchart of a method for performing an additional backup in accordance with one or more embodiments of the invention.

After a data node (e.g., 102A-102C) performs a backup of the at least one asset, in accordance with one or more embodiments of the invention, the cluster manager (e.g., 110) maps the backup in the manner described in more detail with regards to the methods shown in FIGS. 2B and 2C. Specifically, if the asset is associated with a shared volume such as a CSV (e.g., 120), the resulting backup is mapped to the cluster client. If, however, the asset is associated only with the one or more data nodes (e.g., 102A-102C) that perform the backup, the backup is mapped to that one or more data node's mapping.

Figure 1B:
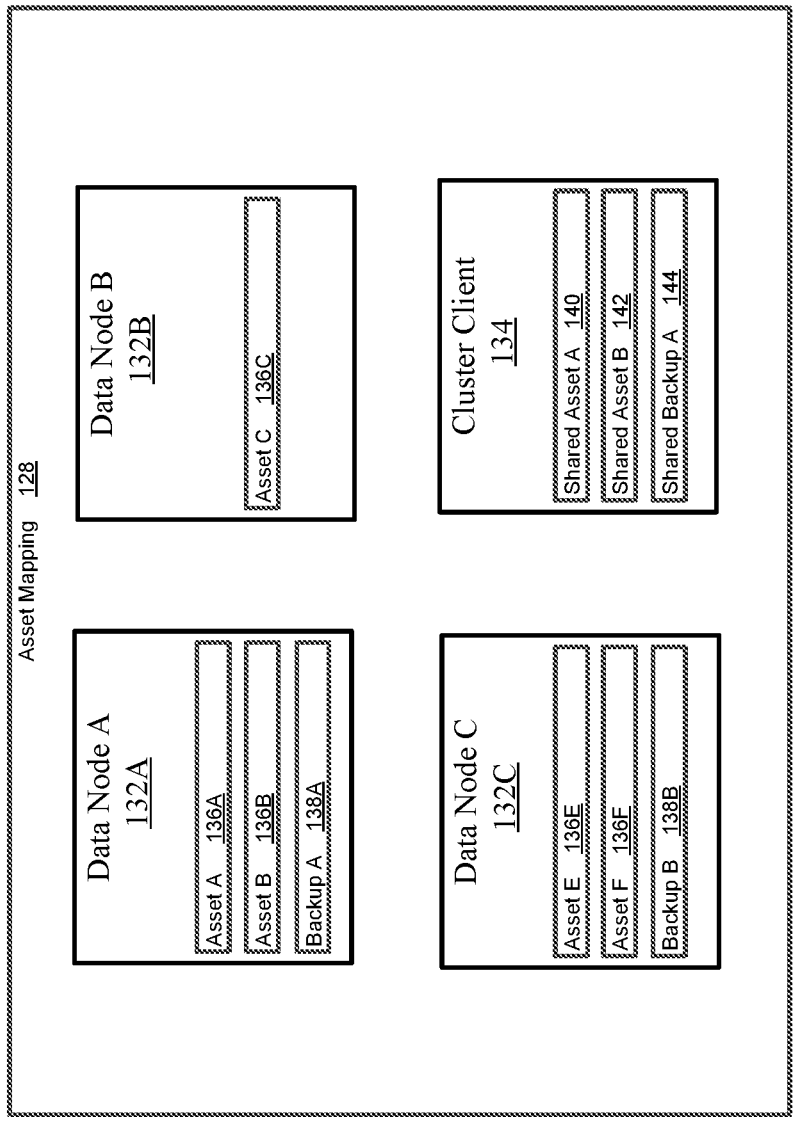
FIG. 1B shows a diagram of an exemplary asset and backup mapping in accordance with one or more embodiments of the invention.

FIG. 1B shows an exemplary asset mapping (e.g., 128) for a three data node system such as that shown in FIG. 1A. The asset mapping (128) includes three data node mappings (e.g., 132A-132C) that may correspond to the data nodes of FIG. 1A (e.g., 102A-102C of FIG. 1A). The data node mappings (e.g., 132A-132C) include mapping of each asset that are located only on the local storage (e.g., 114A-114C of FIG. 1A). Each data node mapping can include multiple assets that are located on local storage volumes which can correspond to physical drives or virtual drives.

For example, the mapping of data node A (132A) may include two local assets: A and B (e.g., 136A and 136B), such as but not limited to data volumes, applications and their associated data, or other assets. Data node B (132B) may include one asset C (e.g., 136C), and data node C (132C) may include two other assets E and F (e.g., 136E and 136F). Each mapping of the data nodes (e.g., 132A-132C) may include more or a smaller number of assets as determined by the cluster manager (e.g., 110, FIG. 1A) during discovery.

The exemplary asset mapping (e.g., 128) may also include mapping determined during discovery or at another time, of assets that are shared. For example, assets that are stored on a CSV (e.g., 120, FIG. 1A), are placed in the cluster client. In addition, assets that are associated with active-passive storage volumes may also be placed in the cluster client since they are accessible and/or associated with more than one data node (e.g., 132A-132C). In the example of FIG. 1B, the cluster client includes two share assets: A and B (e.g., 140 and 142). More or less shared assets can be mapped, and the invention is not limited to the exemplary mappings of FIG. 1B.

When the cluster manager (e.g., 110, FIG. 1A), along with the data nodes (e.g., 102A-102C, FIG. 1A) and/or the data protection manager (e.g., 104, FIG. 1A), performs the methods of FIGS. 2A-2C or similar methods of performing backups, the backups produced by the data nodes (e.g., 102A-102C, FIG. 1A) are mapped to the appropriate data nodes (e.g., 132A-132C, FIG. 1B) or the cluster client (e.g., 134, FIG. 1). Specifically, the backups (138A) that are performed with assets (136A and/or 136B) only associated with data node A (e.g., 102A) are mapped to data node A's mapping (132A). Similarly, the backups (138B) that are performed with assets (136E and/or 136F) only associated with data node C (e.g., 102C) are mapped to data node C's mapping (132C). However, if a backup is performed on a shared asset (e.g., 140 and/or 142), the backup (144), in accordance with one or more embodiments of the invention, is mapped to the cluster client (e.g., 134).

The asset mapping (e.g., 128) may include additional information from that shown in FIG. 1B and described herein. The asset mapping (e.g., 128) may also include information about the location of specific applications and their data on the mapped volumes. The asset mapping (e.g., 128) may also include such information as dependency information, data types (e.g., image data, file data, database data, etc.), and data change rates (i.e., the amount of data change per unit of time). The asset mapping (e.g., 128) may include other and/or additional types of information without departing from the invention.

The asset mapping (e.g., 128), once produced by the cluster manager (e.g., 110, FIG. 1A), is stored on each of the data nodes (e.g., 102A-102C, FIG. 1A). This allows each of the data nodes (e.g., 102A-102C, FIG. 1A) to know where a given asset and/or a given backup is located at any given time. By updating the discovery periodically, such as, but not limited by, every fifteen seconds, and updating the mapping of the backups anytime a backup is performed, the asset mapping (e.g., 128) can remain accurate and provide quicker access times with less inter-node messaging. Further, if one data node fails, the location of at least the shared asset or backup is not lost.

In one or more embodiments of the invention, the cluster manager (e.g., 110, FIG. 1A) is a physical device. The physical device may include circuitry. The physical device may be, for example, a field-programmable gate array, application specific integrated circuit, programmable processor, microcontroller, digital signal processor, or any other hardware processor. The physical device may be adapted to provide the functionality of the cluster manager (e.g., 110, FIG. 1A) as described throughout this application.

In one or more embodiments of the invention, the cluster manager (e.g., 110, FIG. 1A) is implemented as computer instructions (e.g., computer code, stored on a persistent storage) so that when executed by a processor of the cluster (e.g., 100, FIG. 1A) including any-one-of the data nodes (e.g., 102A-102C, FIG. 1A) to provide the functionality of the cluster manager (e.g., 110, FIG. 1A) as described throughout this application.

In one or more embodiments of the invention, the cluster manager (e.g., 110, FIG. 1A) is implemented as a computing device (see e.g., FIG. 3). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions stored on the persistent storage so that when executed by the processor(s) of the computing device it causes the computing device to perform the functionality of a cluster manager (e.g., 110, FIG. 1A) as described throughout this application.

In one or more embodiments of the invention, the cluster manager (e.g., 110, FIG. 1A) is implemented as a logical device. The logical device may utilize the computing resources of any number of computing devices and thereby provide the functionality of the backup storage (e.g., 120, FIG. 1A) as described throughout this application.

In one or more other embodiments of the invention, one or more of the functions of the cluster manager (e.g., 110, FIG. 1A) includes the functions of the methods of FIGS. 2A-2C and these methods may be alternatively performed by a data protection manager (e.g., 104, FIG. 1A), a backup storage (e.g., 106, FIG. 1A), the individual data nodes (e.g., 102A-102C, FIG. 1A), or other component of the system without departing from the invention.

FIG. 2A shows a flowchart of a method for performing a protection event. The method may be performed by, for example, a data protection manager (e.g., 104, FIG. 1A) cluster manager (e.g., 110, FIG. 1A), and/or data node (e.g., 102A-102C, FIG. 1A). Other components of the system illustrated in FIG. 1A may perform all, or a portion, of the method of FIG. 2A without departing from the invention.

While FIG. 2A is illustrated as a series of steps, any of the steps may be omitted, performed in a different order, additional steps may be included, and/or any or all of the steps may be performed in a parallel and/or partially overlapping manner without departing from the invention.

In step 200, a data protection event is initialized. In one or more embodiments of the invention this may be initialized based on an automatic policy or by a user/administrator's request. In accordance with one or more other embodiments of the invention the data protection event may initialized automatically when one or more data nodes have a failover event. Other means for initializing a protection event discovery event associated with a data cluster can be used without departing from the invention.

During the initialization of the data protection event, a user, administrator, or a component of the system such as the data protection manager (e.g., 104, FIG. 1A) determines which assets are to be protected by the data protection event. The selected assets may be one or more selected applications (including the file system itself) that are associated with one or more data nodes (e.g., 102A-102C, FIG. 1A). Alternatively, the selected assets may be one or more volumes (e.g., 114A-114C and 120, FIG. 1A) associated with the data nodes (e.g., 102A-102C, FIG. 1A) or any combination of applications and volumes. Other aspects of the system may be selected for backup without departing from the invention.

If not previously performed or needing updating, once the data protection event is initialized, discovery is performed in step 202. In accordance with one or more embodiments of the invention, discovery (e.g., step 202) is performed at least prior to the performance of one or more data protection events. Discovery, in accordance with one or more embodiments of the invention, may also or alternatively be performed periodically such as every five minutes or other predetermined period of time, and may be performed prior or outside of the method of FIG. 2A. Its location after step 200 is only exemplary, and in accordance with one or more embodiments of the invention may be performed at any time that the data protection policies and/or user/administrator preferences configured the discovery to take place.

Discovery may map all of the assets of a cluster (e.g., 100, FIG. 1) or subset of the assets such as at least the selected assets. The mapping may be stored in each of the data nodes (e.g., 102A-102C, FIG. 1), the CSV (e.g., 120, FIG. 1A), cluster manager (e.g., 110, FIG. 1A), data protection manager (e.g., 104, FIG. 1A), backup storage (e.g., 106, FIG. 1A) or other predetermined component/storage of the cluster (e.g., 100, FIG. 1A) and related systems.

Once the data protection event is initialized in step 200 and in accordance with one or more embodiments of the invention, discovery is performed in step 202, then the method proceeds to step 204. In step 204 a determination is made if the protection event is a backup and/or a restoration of the selected assets. If the event includes a backup the method proceeds to step 206, alternatively if the event only includes a restoration of the selected assets, the method proceeds to step 212.

While step 204 only describes determining between backup and restoration events, other data protection events may follow similar steps to either the backup or restoration steps as appropriate without departing form the invention. Such other events can include snapshots, archiving, migrating, and other data protection events.

In step 206, in accordance with one or more embodiments of the invention, an initial backup is performed for selected assets. The backup is performed by at least one data node (e.g., 102A) that is associated with the selected assets. In at least one embodiments of the invention the initial backup is performed in accordance with the method shown in FIG. 2B and explained below. Other methods may be used alternatively, or in addition to the method described with regards to FIG. 2B.

Once the initial backup in step 206 is performed, the method proceeds to step 208. Step 208 can take place immediately after step 206, or in accordance with one or more embodiments after a predetermined period of time that is selected by a user or administrator, or as determined by a data protection policy or other data protection event. In step 208 an additional backup is performed on the selected assets. This may be an incremental backup or a full backup. An example of the method for performing the additional backup on the selected asset, in accordance with one or more embodiments of the invention is described in more detail with regards to the method shown in FIG. 2C and as described with regards to the method of FIG. 2C below. The method proceeds to step 210, once both the initial backup and one or more additional backups are performed in steps 206 and 208, Though not shown the method may also proceed to step 210 following step 206.

In step 210, in accordance with one or more embodiments of the invention, it can be determined if the protection policy event also includes performing a restoration. If a restoration is also to be performed the method proceeds to step 212. If a restoration is not to be performed, in one or more embodiments of the invention, the method ends following step 210.

If the data protection event is determined in step 204 or 210 to also, or alternatively, include performing a restoration, the method proceeds to step 212. In step 212 a restoration is performed using a preferred data node using the asset mapping. The restoration may use the same data node (e.g., 102A-102C) that was used to perform both or one of the backups and additional backups performed in steps 206 and 208. Alternatively, any other data node (e.g., 102A-102C) may perform the restoration as determined by a data protection policy and/or a user/administrator's selection without departing from the invention.

In one or more embodiments of the invention, the method ends following step 212 or as described above after step 210 if a restoration is not to be performed.

FIG. 2B shows a flowchart of a method for performing an initial backup (e.g., step 206 of FIG. 2A). The method determines if a selected asset is associated with a shared volume and maps the resulting backup to a cluster client when the selected asset is related to a shared volume. The method may be performed by a data node (e.g., 102A-102C, FIG. 1A), cluster manager (e.g., 110, FIG. 1A) or a combination thereof. Other components of the system illustrated in FIG. 1A may perform all, or a portion, of the method of FIG. 2A without departing from the invention.

While FIG. 2B is illustrated as a series of steps, any of the steps may be omitted, performed in a different order, additional steps may be included, and/or any or all of the steps may be performed in a parallel and/or partially overlapping manner without departing from the invention.

In step 220, in accordance with one or more embodiments of the invention, a backup is initiated. The backup may be initiated by a user, administrator, and/or the data protection manager (e.g., 104, FIG. 1A). Other entities may initiate the backup as appropriate. When the backup is initiated a user or other entity that initiated the backup may select one or more assets such as an application or a particular data volume such as the CSV (e.g., 120, FIG. 1A) or volumes located on local storage (e.g., 114A-114C, FIG. 1A). Once the backup is initiated and the one or more assets to be backed up are selected, the method proceeds to step 222.

In step 222, the type of volume a selected asset is associated with is determined. If the selected asset is associated with a shared volume such as a CSV (e.g., 120, FIG. 1A) or an active-passive volume that is associated with two or more nodes, the method proceeds to step 226, otherwise the method proceeds to step 224.

When the selected asset is only associated with a single data node (e.g., 102C, FIG. 1A) and/or its local storage (e.g., 114C, FIG. 1A), the backup produced by the data node (e.g., 102C, FIG. 1A) is mapped to the data node (e.g., 132A-132C, FIG. 1B) that performed the backup and the method proceeds to step 228.

Alternatively, if the selected asset is associated with a shared volume, the method in accordance with one or more embodiments of the invention proceeds from step 222 to step 226. In accordance with one or more embodiments of the invention in step 226, the backup produced from the selected assets that are associated with a shared volume, is mapped to a cluster client (e.g., 134, FIG. 1B) instead of the data node (e.g., 132A-132C, FIG. 1B) which performed the backup.

Once either step 224 or 226 is complete, in accordance with one or more embodiments of the invention, the method proceeds to step 228. In one or more alternative embodiments of the invention, step 228 is performed prior to step 222, and the mapping is performed after the backup is performed and stored. In accordance with one or more embodiments of the invention, in step 228 the backup is performed by a data node (e.g., 102A-102C, FIG. 1A) that is associated with the asset and the backup is stored in appropriate storage, such as but not limited to, the local storage of the data node (e.g., 102A-102C, FIG. 1A), the CSV (e.g., 120, FIG. 1A) or backup storage (e.g., 106, FIG. 1A), or other storage locations that can be accessed when the time a subsequent data protection event is performed. Once the backup is complete, the data protection manager along with the data nodes in the cluster receive an updated copy of the asset mapping, which specifies which are located on each of the nodes along with which volumes are shared volumes. Further, the asset mapping (or a related data structure associated with the asset mapping) includes the type of backup(s) that was performed on the assets. This information may also be stored on each of the data nodes. The duplication of the copies of the asset maps enables all data nodes to have visibility into where the volumes in the cluster are located (i.e., local or shared) and information about the last backup that was performed on the assets.

In one or more embodiments of the invention, the method ends following step 228.

FIG. 2C shows a flowchart of a method for performing an additional backup (such as an updated backup) after at least one initial backup (see e.g., FIG. 2B) in accordance with one or more embodiments of the invention. The method may be performed by, for example in one or more embodiment of the invention, a data node (e.g., 102A, FIG. 1A). Alternatively, the method of FIG. 2C can be performed by the cluster manager (e.g., 110, FIG. 1A) or a data protection manager (e.g., 104, FIG. 1A) or a combination thereof. Other components of the system illustrated in FIG. 1A may perform all, or a portion, of the method of FIG. 2C without departing from the invention.

While FIG. 2C is illustrated as a series of steps, any of the steps may be omitted, performed in a different order, additional steps may be included, and/or any or all of the steps may be performed in a parallel and/or partially overlapping manner without departing from the invention.

In step 230, in accordance with one or more embodiments of the invention, an additional backup is initiated. This may be as a result of a data protection event (such as scheduled periodic backups of a selected asset or other predetermined event) or because of a user or administrator requesting an additional backup of a selected asset(s).

Once the additional backup is initiated in step 230, the method proceeds to step 232, where it is determined if the previous backup is mapped to a cluster client (e.g., 134, FIG. 1B) or to a data node (e.g., 132A-132C, FIG. 1), such as described in more detail above with regards to FIG. 2B. The determination in step 230 is based on the local copy of the asset map (and related data structures (as applicable)) on the data node that is attempting to backup the asset. Further, for shared volumes, the use of the local asset map allows a data node to: (i) initiate a backup (which may be a full or incremental backup) on a shared volume even if the data node did not perform the last backup on the shared volume and (ii) use the state of the last backup of the shared asset (e.g., incremental or full) to determine what type of backup to perform on the shared volume.

If it is determined that the previous backup of the selected asset(s) is not mapped to the cluster client, the method proceeds to step 234, where the current data node (e.g., 102A-102C, FIG. 1A) performs and stores the backup. Alternatively, if the previous backup is mapped to the cluster client the method proceeds from step 232 to step 236, where an incremental backup is performed using the best available data node or a preferred data node.

In one or more embodiments of the invention, the method ends following step 236.

As discussed above, embodiments of the invention may be implemented using computing devices. FIG. 3 shows a diagram of a computing device in accordance with one or more embodiments of the invention. The computing device (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth® interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) may be one or more cores or micro-cores of a processor. The computing device (300) may also include one or more input devices (310) such as a touchscreen, keyboard, mouse, microphone, touchpad, electronic pen, or any other type of input device. Further, the communication interface (312) may include an integrated circuit for connecting the computing device (300) to a network (not shown) (e.g., a local area network (LAN), a wide area network (WAN) such as the Internet, mobile network, or any other type of network) and/or to another device, such as another computing device.

In one embodiment of the invention, the computing device (300) may include one or more output devices (308), such as a screen (e.g., a liquid crystal display (LCD), plasma display, touchscreen, cathode ray tube (CRT) monitor, projector, or other display device), printer, external storage, or any other output device. One or more of the output devices may be the same or different from the input device(s). The input and output device(s) may be locally or remotely connected to the computer processor(s) (302), non-persistent storage (304), and persistent storage (306). Many diverse types of computing devices exist, and the aforementioned input and output device(s) may take other forms.

One or more embodiments of the invention may be implemented using instructions executed by one or more processors of the cluster manager. Further, such instructions may correspond to computer readable instructions that are stored on one or more non-transitory computer readable mediums.

One or more embodiments of the invention may improve the operation of one or more computing devices. More specifically, by mapping backups of shared volumes to a cluster client instead of individual data nodes, one or more embodiments of the invention avoid duplicative backups and/or restorations of the same shared assets by each of the data nodes. Further if a failure occurs to the particular node the backup may have originated from, in accordance with one or more embodiments of the invention, because the method is agnostic with regards to the individual nodes the backup may have originated from, any remaining data node can discover the backup and perform a restoration or incremental backup. This will provide better protection for the clustered nodes and reduce duplication of backup activities.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for performing backups in a cluster environment comprising a plurality of data nodes, the method comprising:
    performing a first backup of at least one asset, wherein the first backup is initiated by a first data node of the plurality of data nodes;
    determining, by a data protection manager, if the at least one asset is associated with a shared volume in the cluster environment;
    based on the determination by the data protection manager, mapping, by the data protection manager, the first backup, wherein:
        in response to the at least one asset being associated with at least one shared volume, a mapping of the first backup is mapped to a cluster client, and
        in response to the at least one asset not being associated with at least one shared volume, the mapping of the first backup is mapped to the first data node;
    storing the mapping of the first backup on each of the plurality of data nodes, wherein each data node of the plurality of data nodes has visibility into where the shared volume in the cluster environment is located;
    receiving a request to perform an additional backup of the at least one asset, wherein the additional backup is initiated by an additional data node that is a different one of the plurality of data nodes than the data node that initiated the first backup;
    determining, by the additional data node, if the first backup is mapped to the cluster client;
    based on the determination by the additional data node, performing, by the additional data node, the additional backup of the at least one asset, wherein:
        if the first backup is mapped to the cluster client, the additional backup is an incremental backup and is mapped, by the data protection manager, to the cluster client, and
        storing a mapping of the additional backup on each of the plurality of data nodes.

2. The method of claim 1, wherein a user of the cluster environment selects the at least one asset.

3. The method of claim 1, wherein the at least one asset comprises of a plurality of assets.

4. The method of claim 3, wherein the plurality of assets is associated with a plurality of volumes including the at least one shared volume.

5. The method of claim 1, further comprising: performing a recovery of the at least one asset from at least the first backup and the additional backup.

6. The method of claim 1, further comprising: storing the first backup and the additional backup on backup storage associated with the cluster environment.

7. The method of claim 1, wherein in response to the first backup not being mapped to the cluster client, the additional backup is a full backup.

8. A system comprising:
    a plurality of data nodes, wherein a first data node of the plurality of data nodes is configured to perform a first backup of at least one asset;
    a data protection manager comprising:
    at least one processor;
    at least one storage device; and
    at least one memory that includes instructions, which when executed by the processor, performs a method, the method comprising:
    determining, by the data protection manager, if the at least one asset is associated with a shared volume in a cluster environment;
    based on the determination by the data protection manager, mapping, by the data protection manager, the first backup, wherein:
        in response to the at least one asset being associated with at least one shared volume, a mapping of the first backup is mapped to a cluster client, and
        in response to the at least one asset not being associated with at least one shared volume, the mapping of the first backup is mapped to the first data node;
    storing the mapping of the first backup on each of the plurality of data nodes, wherein each data node of the plurality of data nodes has visibility into where the shared volume in the cluster environment is located;
    wherein an additional data node that is a different one of the plurality of data nodes than the data node that initiated the first backup is configured to:

receive a request to perform an additional backup of the at least one asset, wherein the additional backup is initiated by the additional data node;

determining if the first backup is mapped to the cluster client;

based on the determination by the additional data node, performing the additional backup of the at least one asset, wherein:

if the first backup is mapped to the cluster client, the additional backup is an incremental backup and is mapped, by the data protection manager, to the cluster client; and storing a mapping of the additional backup on each of the plurality of data nodes.

9. The system of claim 8, wherein a user of the cluster environment selects the at least one asset.

10. The system of claim 8, wherein the at least one asset comprises of a plurality of assets.

11. The system of claim 10, wherein the plurality of assets is associated with a plurality of volumes including the at least one shared volume.

12. The system of claim 8, further comprising: initiating a recovery of the at least one asset from at least the first backup and the additional backup.

13. The system of claim 8, further comprising storing the first backup and the additional backup on backup storage associated with the cluster environment.

14. The system of claim 8, wherein if the first backup is not mapped to the cluster client, the additional backup is a full backup.

15. A non-transitory computer readable medium comprising computer readable program code, which when executed by a computer processor enables the computer processor to perform a method for performing backups in a cluster environment comprising of a plurality of data nodes, the method comprising:

determining if at least one asset is associated with a shared volume in the cluster environment;

based on the determination by a data protection manager, mapping a first backup, wherein:

in response to the at least one asset being associated with at least one shared volume, a mapping of the first backup is mapped to a cluster client, and in response to the at least one asset not being associated with at least one shared volume, the mapping of the first backup is mapped to a first data node of the plurality of data nodes;

storing the mapping of the first backup of the at least one asset on each of the plurality of data nodes, wherein each data node of the plurality of data nodes has visibility into where the shared volume in the cluster environment is located;

wherein the mapping is used by an additional data node that is a different one of the plurality of data nodes than a data node that initiated the first backup to perform an additional backup of the at least one asset.

16. The non-transitory computer readable medium of claim 15, wherein a user of the cluster environment selects the at least one asset.

17. The non-transitory computer readable medium of claim 15, wherein the at least one asset comprises of a plurality of assets.

18. The non-transitory computer readable medium of claim 17, wherein the plurality of assets is associated with a plurality of volumes including the at least one shared volume.

19. The non-transitory computer readable medium of claim 15, wherein the first backup and the additional backup are stored on backup storage associated with the cluster environment.

20. The non-transitory computer readable medium of claim 15, wherein if the first backup is not mapped to the cluster client, the additional backup is a full backup.

\* \* \* \* \*